May 29, 1956 — H. W. SONTHEIM — 2,747,745
PARCEL RACKS FOR VEHICLES
Filed June 7, 1954 — 3 Sheets-Sheet 1
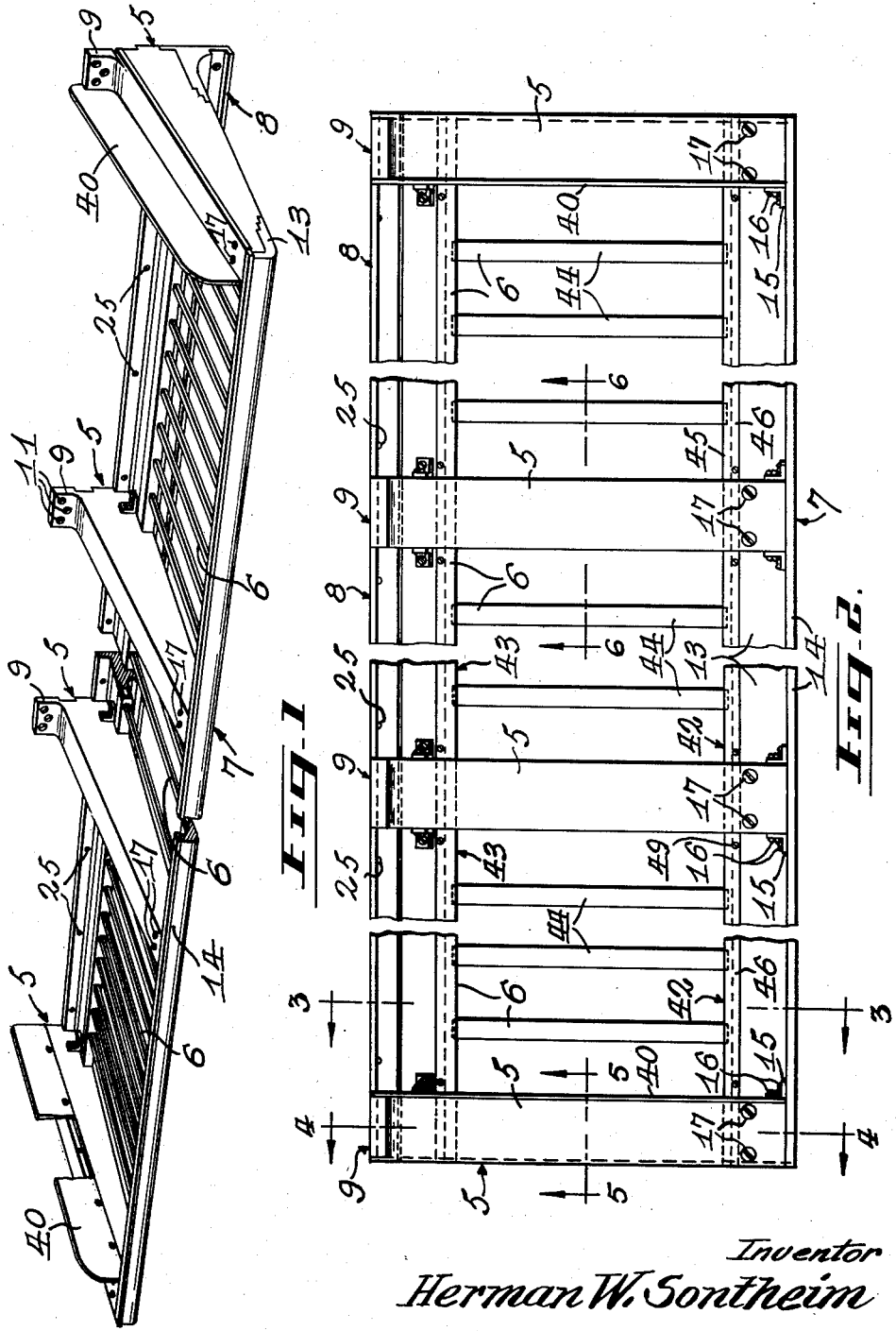
Inventor
Herman W. Sontheim
By Fetherstonhaugh & Co.
Attorneys May 29, 1956　　　H. W. SONTHEIM　　　2,747,745
PARCEL RACKS FOR VEHICLES
Filed June 7, 1954　　　　　　　　　　3 Sheets-Sheet 2
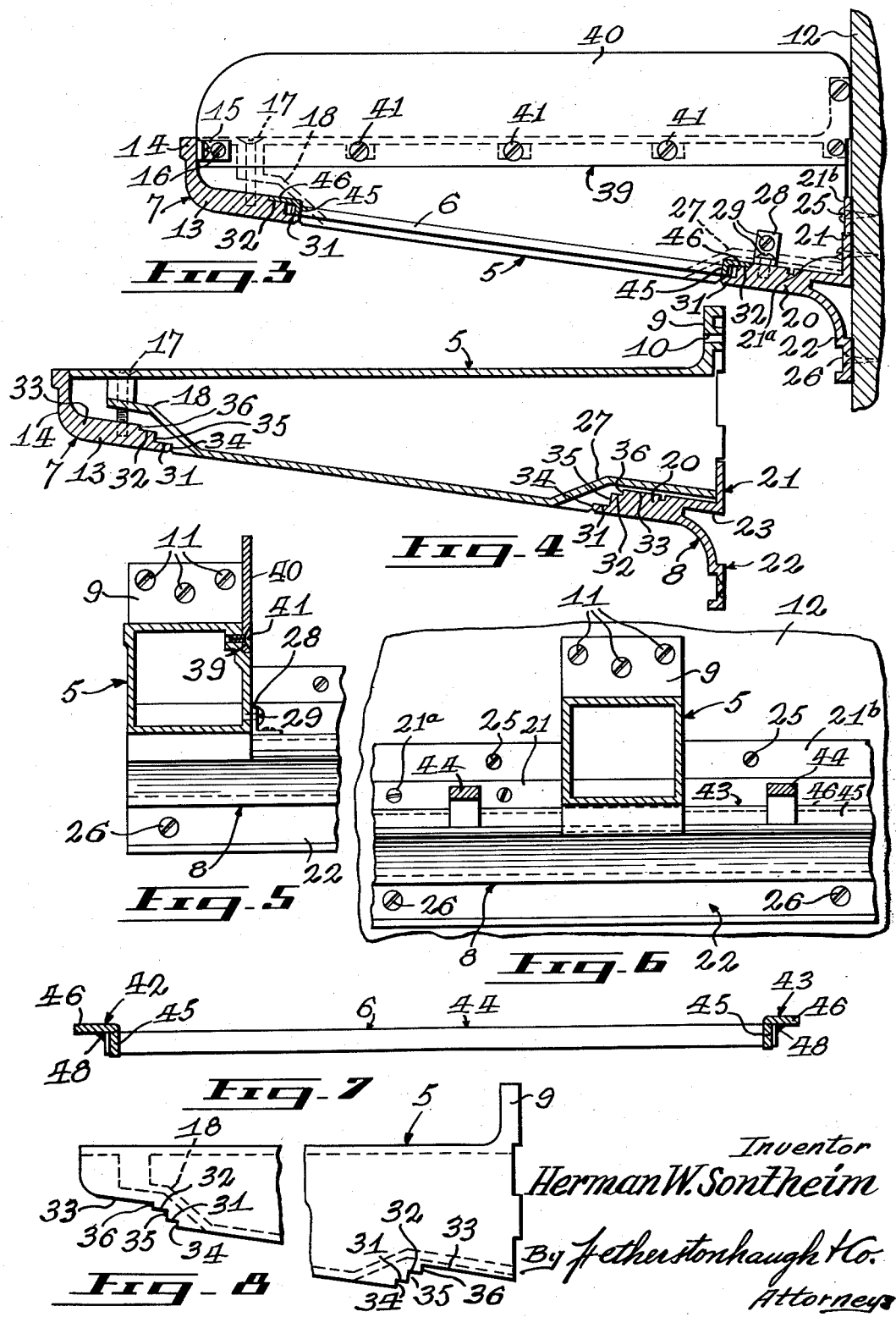

May 29, 1956  H. W. SONTHEIM  2,747,745
PARCEL RACKS FOR VEHICLES
Filed June 7, 1954  3 Sheets-Sheet 3
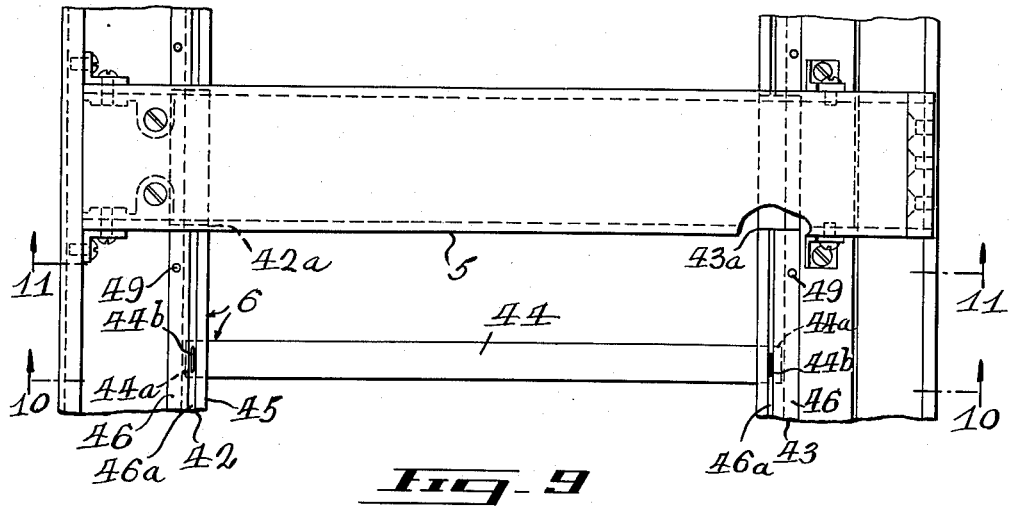
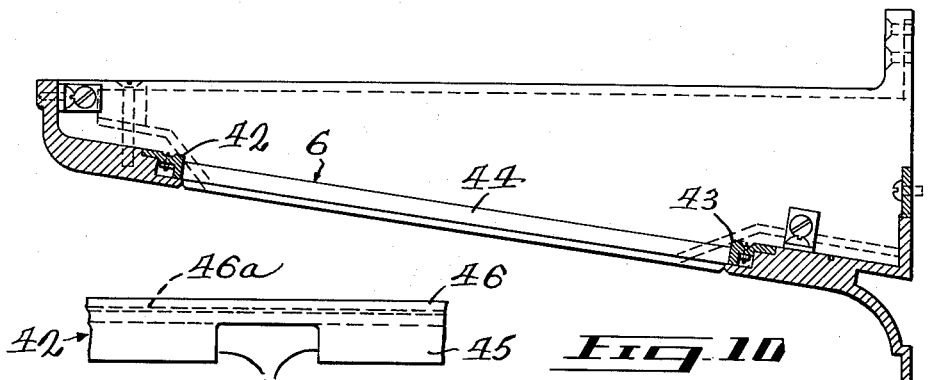
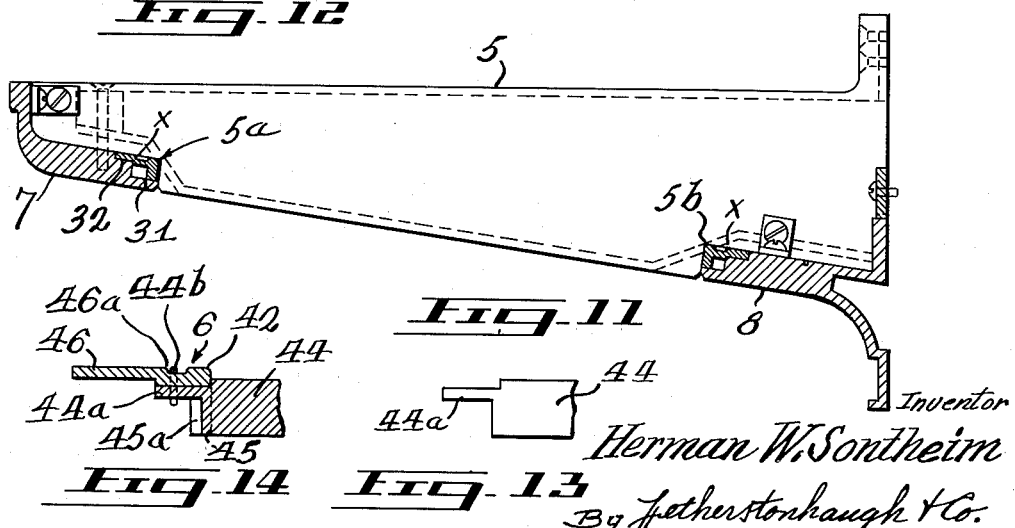
Inventor
Herman W. Sontheim
By Fetherstonhaugh & Co.
Attorneys

United States Patent Office 2,747,745
Patented May 29, 1956

2,747,745

PARCEL RACKS FOR VEHICLES

Herman W. Sontheim, Verdun, Quebec, Canada, assignor to The Robert Mitchell Co. Limited, St. Laurent, Montreal, Quebec, Canada Application June 7, 1954, Serial No. 434,809

2 Claims. (Cl. 211—90)

This invention relates to parcel racks for railway passenger cars and the object is to provide an improved rack installation of pleasing appearance composed of parts designed to facilitate rapid and economical fabrication and assembly thereof.

Other objects and advantages as well as the characteristic novel features of the invention will be apparent from the following detailed description of the accompanying drawings, in which—

Fig. 1 is a perspective view of a parcel rack installation embodying the invention.

Fig. 2 is a top, plan view of the installation shown in Fig. 1.

Fig. 3 is a transverse sectional view taken substantially along the section line 3—3 of Fig. 2.

Fig. 4 is a transverse sectional view taken substantially along the section line 4—4 of Fig. 2.

Fig. 5 is a sectional view taken substantially along the section line 5—5 of Fig. 2.

Fig. 6 is a sectional view taken substantially along the section line 6—6 of Fig. 2.

Fig. 7 is a sectional view of one of the removable article supporting racks forming part of the complete installation, shown in Figs. 1 and 2.

Fig. 8 is a side elevational view of one of the brackets forming part of the installation shown in Figs. 1 and 2.

Fig. 9 is a fragmentary plan view of a modified form of rack installation.

Fig. 10 is a sectional view taken substantially along the line 10—10 of Fig. 9.

Fig. 11 is a sectional view taken substantially along the line 11—11 of Fig. 9 and Figs. 12, 13 and 14 are detail views of component parts of a modified form of article supporting rack forming part of the assembly shown in Figs. 9 to 11 inclusive.

The installation shown in Figs. 1 to 8 inclusive comprises a series of transversely extending, laterally spaced, parallel wall brackets 5, a plurality of removable article supporting racks 6 positioned between said brackets and front and rear longitudinally extending mouldings 7 and 8 secured to the front and rear end portions of brackets 5 and serving to removably support thereon the front and rear marginal portions of the racks 6.

The brackets 5 are of substantially hollow rectangular shape and gradually diminish in height toward their front ends so that they present a tapered appearance in side elevation. The rear ends of the brackets are formed with upwardly projecting attaching flanges 9 provided with holes 10 (Fig. 4) through which screws 11 or other fastening means are passed to secure the brackets to the wall structure 12 (Figs. 3 and 6) of a railway passenger car.

The front moulding 7 includes a body portion 13 and a front flange 14 extending upwardly from the front edge of said body portion and covering the front ends of the bracket 5. The front ends of brackets 5 are secured to the flange 14 of moulding 7 by fastening brackets 15 and screws 16. The front ends of brackets 5 are also secured to the body portion 13 of moulding 7 by vertical screws 17. The front end portion 18 of the bottom wall of each bracket 5 through which the vertical screws 17 pass are vertically offset so as to overlie the body portion 13 of the moulding 7 as clearly shown in Figs. 3 and 4.

The rear moulding 8 includes a body portion 20 formed with rearwardly disposed upper and lower attaching flanges 21 and 22. The attaching flange 21 bears against the rear ends of brackets 5 and is fastened to the wall structure 12 by screws 21a or other suitable fastening means. The lower rear flange 22 of moulding 8 is also fastened to wall structure 12 by screws 26 or other suitable fastening means. The rear ends of the bottom wall portions of the brackets 5 are offset vertically as indicated at 27 and overlie the body portion 20 of moulding 8. The side walls of brackets 5 are fastened to the body portion 20 of moulding 8 by brackets 28 and fastening screws 29. A trim strip 21b is positioned directly above flange 21 of moulding 8 and is fastened to the wall by screws 25.

The side walls of brackets 5 are formed so that their lower edges project below the front and rear vertically offset bottom wall portions 18 and 27 of said brackets. The lower edges of the front and rear ends of the side walls of brackets 5 are shaped to provide stepped surfaces which fit snugly against correspondingly stepped surfaces presented by the body portions 13 and 20 of the front rear mouldings 7 and 8. As shown to advantage in Figs. 1, 3, 4 and 8 each of the stepped surfaces here referred to presents a series of horizontally and vertically offset horizontally extending surfaces 31, 32 and 33 and a series of horizontally and vertically offset vertically extending surfaces 34, 35 and 36. In this connection it will be observed that the forwardly and rearwardly disposed stepped surfaces of the side walls of the brackets 5 serve to conceal from view the upwardly offset bottom wall portions 18 and 27 of the brackets and also cooperate with the complementary stepped surfaces of the front and rear mouldings 7 and 8 to permit the brackets to be assembled with the mouldings so that the bottom surfaces of the mouldings are co-planar with the intermediate portions of the bottom walls of the brackets and with the intermediate portions of the lower edges of the side walls of the bracket.

The terminal brackets 5 of the rack installation are formed at their inner upper corners with rabbets or recesses 39 in which are fitted the lower edge portions of vertically extending guard plates 40 which are fastened to the brackets by screws 41. Alternately, the guard plates 40 may be formed as integral upward extensions of the terminal brackets 5.

Each of the removable racks 6 comprises front and rear longitudinally extending angle members 42 and 43 supporting between them a plurality of laterally spaced transversely extending article supporting bars 44. The front member 42 presents a downwardly directed vertical limb 45 which rests on the stepped horizontal surface 31 of the moulding 7 and a forwardly directed limb 46 which rests on the stepped horizontally extending surfaces 32 of said moulding. The rear rack member 43 presents a vertical limb 45 which rests on the stepped surface 31 of the rear moulding 8 and a rearwardly directed horizontal limb 46 which rests on the stepped surface 32 of the rear moulding. The ends of the article supporting bars 44 extend through slots 45a formed in the vertical flanges 45 of the front and rear members 42 and 43 and are welded to the vertical flanges 46 as indicated at 48.

The front and rear marginal members 42 and 43 of each rack 6 are made of a length equal to the spacing of the brackets 5 between which the rack is arranged so that the ends of the front and rear members of the rack will fit closely against the opposing sides of said brackets. The racks 6 are secured against vertical displacement by fastening screws 49 passing downwardly through the horizontal flanges 46 of the front and rear rack members 42 and 43 and into the underlying stepped supporting surfaces 32 of the front and rear mouldings 7 and 8.

With an installation of the type shown in Figs. 1 to 8 inclusive it sometimes happens that, due to expansion or contraction of the metal parts of the rack assembly, gaps are formed between the sides of the brackets 5 and the adjacent ends of the front and rear members 42 and 43 of the racks 6 arranged between said brackets. When this condition occurs and is objected to by the railway companies it may be remedied by means of the modified installation shown in Figs. 9 to 14 inclusive. In this modified installation the front and rear marginal members 42 and 43 of each removable article supporting rack 6 are made of a length greater than the spacing of the brackets 5 between which the rack is arranged and the ends 42a and 43a of the said rack members 42 and 43 extend a short distance beneath the brackets 5 as clearly shown in Fig. 9. The extent to which the ends 42a and 43a of the front and rear members 42 and 43 of each rack overlap the bottom surfaces of the brackets 5 between which the rack is arranged is relatively slight but is sufficient to eliminate any possibility of gaps occurring between the ends of the rack members 42 and 43 and the sides of the brackets 5 due to expansion and contraction of the racks or other parts of the installation. The small extent to which the ends of the rack members 42 and 43 overlap the bottom surfaces of the brackets 5 also makes it easy to slide the rack 6 into the space between the brackets.

In order to permit the ends of the front and rear members 42 and 43 of each rack 6 to be disposed beneath the brackets 5 in the manner shown in Fig. 9 it is necessary to modify the shape of the front and rear ends of the brackets 5 to provide clearance between these portions of the brackets and the stepped surfaces of the underlying portions of the mouldings 7 and 8. This clearance, which is indicated at X (Fig. 11), is obtained by shaping the front and rear ends of the brackets 5 to present rectangular recesses 5a and 5b in which the mouldings 7 and 8 are received so that the stepped surfaces 31 and 32 of the mouldings are spaced from the defining walls of the recesses 5a and 5b.

Figs. 9 to 11 inclusive also illustrate a modified method of constructing the article supporting racks 6 which is simpler, easier and more economical than the method illustrated in Figs. 1 to 8 inclusive. In the arrangement shown in Figs. 9 to 14 inclusive the ends of the rack bars 44 are fitted in notches 45a provided in the downwardly directed limbs 45 of the front and rear rack members 42 and 43 and are provided with relatively thin extensions 44a which are secured to the horizontal limbs 46 of the front and rear rack members 42 and 43 by metal stitching 44b, said stitching being counter-sunk in a groove or channel 46a provided in the upper surfaces of the limb 46. This metal stitching of the extensions 44a of the rack bars 44 to the horizontal limbs 46 of the front and rear rack members 42 and 43 may eventually be accomplished by means of a "bostitch" or similar type of machine employed for fastening together metal parts by metal stitching or stapling.

Having thus described the nature of my invention and a preferred embodiment thereof it will be understood that various modifications may be resorted to within the scope and spirit of the invention as defined by the appended claims.

The embodiments of the invention in which an exclusive property or privilege is claimed are defined as follows:

1. A parcel rack installation for vehicles comprising a plurality of spaced transversely extending brackets, front and rear mouldings secured to and underlying the front and rear ends of said brackets and extending between said brackets, said mouldings having their opposing edges stepped to provide upper and lower horizontally disposed supporting steps supporting thereon front and rear members of removable article supporting racks arranged between said brackets, each of said article supporting racks comprising front and rear angle members, each presenting a downwardly extending limb, a plurality of laterally spaced article supporting bars extending between and secured to said angle members, the ends of said bars extending through slots in the downwardly extending limbs of the angle members and being anchored to the undersides of the horizontally extending limbs of said angle members and resting on the lower supporting step of said front and rear mouldings.

2. A parcel rack installation for vehicles comprising a plurality of spaced transversely extending brackets, front and rear mouldings secured to and underlying the front and rear ends of said brackets and extending between said brackets, said mouldings having their opposing edges stepped to provide upper and lower horizontally disposed supporting steps supporting thereon front and rear members of removable article supporting racks arranged between said brackets, each of said article supporting racks comprising front and rear angle members and a plurality of article supporting bars extending between and secured to said angle members, said angle members presenting horizontally outwardly directed limbs supported on the upper steps of said mouldings and downwardly directed limbs supported on the lower steps of said mouldings, said downwardly directed limbs of the angle members having slots therein and a plurality of article supporting bars extending between said angle members, the ends of said article supporting bars passing through the slots of the downwardly directed limbs and being anchored to the underside of the horizontally extending limbs of said angle members and resting on the lower supporting step of said front and rear mouldings.

References Cited in the file of this patent

UNITED STATES PATENTS

| | | |
|---|---|---|
| 815,201 | McClennan | Mar. 13, 1906 |
| 1,035,927 | Watson | Aug. 20, 1912 |
| 2,091,599 | Larson et al. | Aug. 31, 1937 |
| 2,251,050 | Hagerty et al. | July 29, 1941 |
| 2,284,356 | Arenberg | May 26, 1942 |
| 2,639,817 | Ehret | May 26, 1953 |